United States Patent Office 3,317,460
Patented May 2, 1967

3,317,460
HYDROXYORGANOSILOXANES AND
COPOLYMERS
Harold A. Clark and Loren A. Haluska, Midland, Mich.,
assignors to Dow Corning Corporation, Midland, Mich.,
a corporation of Michigan
No Drawing. Filed Apr. 1, 1963, Ser. No. 269,781
21 Claims. (Cl. 260—46.5)

This invention relates to new silanes and siloxanes and to copolymers containing the siloxanes.

The silanes and siloxanes of this invention are useful as curing agents for isocyanate prepolymers, for preparing polyurethane rubbers and for making varnishes.

More particularly, this invention relates to siloxanes of the general formula

wherein R is a trivalent or tetravalent hydrocarbon radical or hydrocarbon ether radical that is bonded to the silicon atom through a silicon-carbon bond, R' is a monovalent hydrocarbon radical free of aliphatic unsaturation, $a$ is an integer from 0 to 3 inclusive, $b$ is 1 or 2, $c$ is 2 or 3 and all of the hydroxyl groups are primary hydroxyl groups. It is obvious, of course, that the sum of $a+b$ cannot be greater than 3.

This invention also relates to silanes of the general formula $[(HO)_cR]_bSiR'_a$, wherein R, R', $a$, $b$ and $c$ have the above defined meanings. It is obvious, of course, that the sum of $a+b$ must be equal to 4.

Also, this invention relates to copolymers of the above siloxanes with siloxanes having the general formula $R''_nSiO_{4-n/2}$, wherein R'' is a monovalent hydrocarbon or halogenated hydrocarbon radical free of aliphatic unsaturation and $n$ is an integer from 0 to 3 inclusive.

In the above formulae, for example, the $[(HO)_cR]$ group can be, for example, aliphatic radicals such as $(HOCH_2)_2CHCH_2CH_2$—
$(HOCH_2CH_2)(HOCH_2)CHCH_2CH_2CH_2CH_2$—
$(HOCH_2CH_2)_3CCH_2CH_2$—
$(HOCH_2CH_2)(HOCH_2)CHCH(CH_2OH)CH_2CH_2CH_2$—

$HOCH_2CH_2CH_2CH_2CH_2CH(CH_2CH_2OH)$
$CH_2CH_2CH(CH_2CH_3)$—

$(HOCH_2CH_2)_2CHCH_2CH_2$—
$(HOCH_2)_2CHOCH_2CH_2CH_2$—
$(HOCH_2)_2CHOCH_2CH_2$—
$(HOCH_2)(HOCH_2CH_2CH_2CH_2)CHOCH_2CH_2CH_2$—
$(HOCH_2CH_2)_2CHCH_2OCH_2CH_2CH_2$— or a $(HOCH_2)_2C(CH_3)[CH_2(OCH_2CH_2)_6OCH_2CH_2CH_2$—]

group and cyclic radicals such as

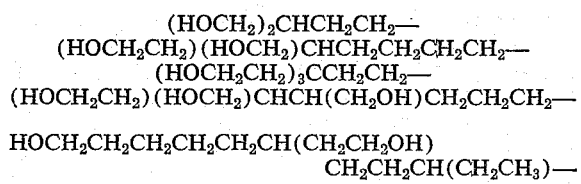

or

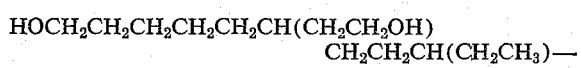

In the above formulae the R' and R'' groups can be, for example, alkyl groups such as methyl, ethyl, propyl, isopropyl, butyl, isobutyl, amyl, hexyl, heptyl, octyl, nonyl, decyl, dodecyl, pentadecyl, octadecyl; cyclic hydrocarbon groups such as phenyl, tolyl, benzyl, xenyl, naphthyl or a cyclohexyl group. In addition, the R'' group can also be haloalkyl groups such as $CF_3CH_2CH_2$—
$CF_3CF_2CH_2CH_2$—
$CF_3CF_2CF_2CH_2CH_2$—
—$CH_2CH_2CH_2Cl$
$CF_3CF_2CF(CF_3)CH_2CH_2$—
$(CF_3)CHCH_2$—
$(CF_3)_2CFCH_2CH_2$— or a $C_7F_{15}CH_2CH_2$— group and halogenated cyclic hydrocarbon radicals such as chlorocyclohexyl, α,α,α-trifluorotolyl, bromophenyl, pentachloroxenyl, chloronaphthyl and chlorocyclopentyl.

The silanes and siloxanes of this invention can be prepared by any suitable process such as by the addition of the appropriate hydroxy olefinic compound to the appropriate silane or siloxane containing one or two silicon-bonded hydrogen atoms per silicon atom, in the presence of a platinum catalyst. This and other suitable processes by which these silanes and siloxanes can be prepared are well known and will be obvious to those skilled in the art. Illustrative of these processes is the one disclosed in U.S. Patent 2,823,218.

The copolymers of this invention contain at least one siloxane unit of the general formula

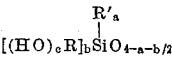

the remaining siloxane units being of the general formula $R''_nSiO_{4-n/2}$. These copolymers can be prepared by any of the well known means such as by first preparing a copolymer containing silicon-bonded hydrogen atoms and then reacting the resultant copolymer with the appropriate hydroxy olefinic compound in the presence of a platinum catalyst.

In order that those skilled in the art may better understand how the present invention can be practiced, the following examples are given by way of illustration and not by way of limitation.

Example 1

244 g. of trimethylolpropanemonoallylether, 0.5 g. of a 1 percent solution of platinum (as chloroplatinic acid) in dimethylphthalate and 1 g. of Seasorb 43 (magnesium oxide) were mixed and heated to 144° C. Then 200 g. of the siloxane $H(CH_3)_2Si[OSi(CH_3)_2]_{2\cdot11}OSi(CH_3)_2H$ was added to the mixture and the resultant mixture heated at 142–144° C. for 24 hours. The reaction mixture was then stripped to 182° C. at 6 mm. of pressure leaving 329.8 g. of the product in the pot. The product was

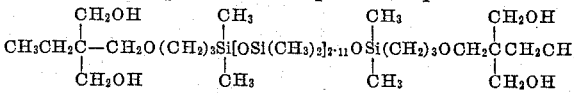

and had a viscosity of 689.4 cs. at 25° C.

Example 2

100 g. of the monoallylether of pentaerythritol, 0.3 g. of a 1 percent solution of platinum (as chloroplatinic acid) in dimethylphthalate and 1 g. of charcoal were mixed and heated to 140° C. Then a solution of 141.8 g. of the siloxane $H(CH_3)_2Si[OSi(CH_3)_2]_{5\cdot87}OSi(CH_3)_2H$ in 74.7 g. of xylene was added to the mixture and the resultant mixture heated at 140–147° C. for 24 hours. The reaction mixture was then stripped to 183° C. at 2 mm. of pressure leaving 169.5 g. of the product in the pot. The product was

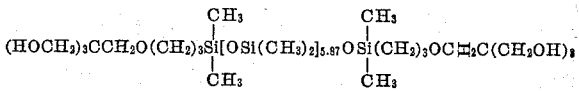

and had a viscosity of 253.5 cs. at 25° C.

Example 3

191.3 g. of trimethylolpropanemonoallylether, 0.3 g. of a 1 percent solution of platinum (as chloroplatinic acid) in dimethylphthalate and 1 g. of Seasorb 43 (magnesium oxide) were mixed and heated to 140° C. Then 67.1 g. of the siloxane H(CH₃)₂SiOSi(CH₃)₂H was added to the mixture and the resultant mixture heated at 139–160° C. for 24 hours. The reaction mixture was then stripped to 184° C. at 1.1 mm. of pressure leaving 146.6 g. of the product in the pot. The product was

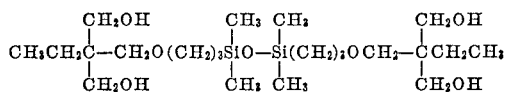

and had a viscosity of 4,639 cs. at 25° C.

Example 4

274.3 g. of trimethylolpropanemonoallylether, 0.5 g. of a 1 percent solution of platinum (as chloroplatinic acid) in dimethylphthalate and 1 g. of Seasorb 43 (magnesium oxide) were mixed and heated to 143° C. Then 203 g. of the siloxane

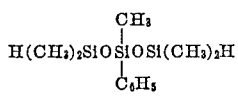

was added to the reaction mixture and the resultant mixture heated at 140–143° C. for 24 hours. The reaction mixture was then stripped to 185° C. at 1.4 mm. of pressure leaving 325.7 g. of the product in the pot. The product was

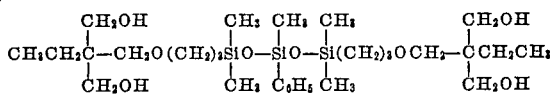

and had a viscosity of 4,639 cs. at 25° C.

Example 5

A mixture of 382 g. of $(C_6H_5)(CH_3)SiCl_2$, 177 g. of $(C_6H_5)HSiCl_2$ and 374 g. of toluene was added to 1,020 g. of water and hydrolyzed to yield a hydrolyzate containing a copolymer of $(C_6H_5)(CH_3)SiO$ and $(C_6H_5)HSiO$ units. The hydrolyzate was washed 3 times with water to remove excess HCl, then 18 drops of concentrated $H_2SO_4$ was added and the hydrolyzate refluxed at 107–110° C. for 2½ hours. Then 60 g. of Witcarb ($CaCO_3$) was added, the mixture stirred for 45 minutes at about 35° C. and then filtered. The filtrate was then stripped to 150° C. at about 3–4 mm. of pressure to obtain the product.

A mixture of 46.4 g. of trimethylolpropanemonoallylether, 50 g. of Cellosolve acetate and 20 drops of a .1 M chloroplatinic acid solution in butyl acetate was prepared and heated to 110° C. Then a mixture of 100 g. of the fluid prepared above and 47.6 g. of Cellosolve acetate was added slowly over a period of about 9 minutes. An exothermic reaction took place. A light tan solution of low viscosity which was a copolymer of $(C_6H_5)(CH_3)SiO$ and

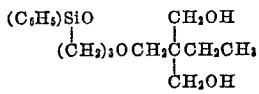

units was obtained.

Example 6

A mixture of 174 g. of trimethylolpropanemonoallylether and 20 drops of a .1 M chloroplatinic acid solution in butyl acetate was prepared and heated to 110° C. Then 61 g. of phenylmethylsilane was added slowly over a period of about 18 minutes. The reaction was very exothermic so the mixture was externally cooled during the addition to keep the temperature of the mixture in the range from 120–130° C. A grey solution of low viscosity which was a silane of the formula below was obtained.

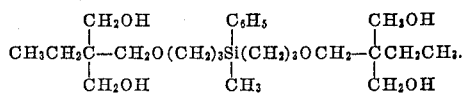

Example 7

A mixture of 104.5 g. of trimethylolpropanemonoallylether and 10 drops of a .1 M chloroplatinic acid solution in butyl acetate was prepared and heated to 110° C. Then 73.6 g. of $(C_6H_5)(CH_3)HSiOSiH(CH_3)(C_6H_5)$ was added slowly over a period of about 6 minutes. An exothermic reaction took place. A very viscous light tan product was obtained which was

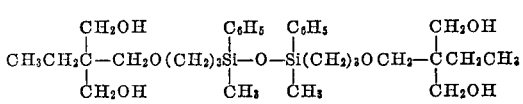

Example 8

A mixture of 102.4 g. of trimethylolpropanemonoallylether, 201.6 g. of xylene and 27 drops of a .1 M chloroplatinic acid solution in butyl acetate was prepared and heated to 110° C. Then 200 g. of a solution of a copolymer of $(C_6H_5)(CH_3)SiO$ units and $(CH_3)HSiO$ units in the ratio of about 2.25:1 in xylene (about 66 percent solids) was added slowly over a period of about 10 minutes. Heating of the mixture was stopped when the addition of the copolymer was started. An exothermic reaction took place with the temperature of the mixture rising to about 124° C. A copolymer of $(C_6H_5)(CH_3)SiO$ and $[CH_3CH_2C(CH_2OH)_2CH_2O(CH_2)_3]$ $(CH_3)SiO$ units was obtained.

Example 9

When stoichiometric amounts of the following silanes and hydroxy olefinic compounds are reacted employing the process of Example 6 or 7, the indicated product is obtained.

(A)

Silane—$(C_6H_5)_2SiH_2$
Olefin—$(HOCH_2)_3CCH_2OCH_2CH=CH_2$
Product—$(C_6H_5)_2Si[(CH_2)_3OCH_2C(CH_2OH)_3]_2$ (B)

Silane—$(CH_3)_2(C_3H_7)SiH$
Olefin—$(HOCH_2CH_2CH_2)_2CHO(CH_2)_3OCH_2CH=CH_2$
Product—$(CH_3)_2(C_3H_7)Si(CH_2)_3O(CH_2)_3OCH(CH_2CH_2CH_2OH)_2$ (C)

Silane—$(CH_3)_2SiH_2$
Olefin—$(HOCH_2CH_2)_3CCH=CH_2$
Product—$(CH_3)_2Si[CH_2CH_2C(CH_2CH_2OH)_3]_2$

Example 10

When stoichiometric amounts of the following siloxanes and hydroxy olefinic compounds are reacted employing the process of Example 1, 4 or 7, the indicated product is obtained. In this example $x$, $q$, $m$, $w$, and $y$ are integers.

(A)

Siloxane—$H(CH_3)_2Si[OSi(CH_3)(CH_2CH_2CF_3)]_xOSi(CH_3)_2H$
Olefin—$CH_3CH_2C(CH_2OH)_2CH_2OCH_2CH=CH_2$
Product—$[CH_3CH_2C(CH_2OH)_2CH_2O(CH_2)_3](CH_3)_2Si[OSi(CH_3)(CH_2CH_2CF_3)]_xOSi(CH_3)_2[(CH_2)_3OCH_2C(CH_2OH)_2CH_2CH_3]$ (B)

Siloxane—$(CH_3)_3Si[OSi(CH_3)H]_qOSi(CH_3)_3$
Olefin—$(HOCH_2)_3CCH_2OCH_2CH=CH_2$
Product—$(CH_3)_3Si\{OSi(CH_3)[CH_2CH_2CH_2OCH_2C(CH_2OH)_3]\}_qOSi(CH_3)_3$ (C)

Siloxane—H₂(CH₃)Si[OSi(CH₃)₂]ₘOSi(CH₃)H₂
Olefin—(HOCH₂CH₂)₂CHCH₂OCH₂CH=CH₂
Product—[(HOCH₂CH₂)₂CHCH₂O(CH₂)₃]₂(CH₃)Si
 [OSi(CH₃)₂]ₘOSi(CH₃)[(CH₂)₃OCH₂CH
 CH₂CH₂OH)₂]₂

(D)

Siloxane—H(CH₃)₂Si[OSi(CH₃)₂]wOSi(CH₃)₂H
Olefin—CH₃CH₂C(CH₂OH)₂CH₂OCH₂CH=CH₂
Product—

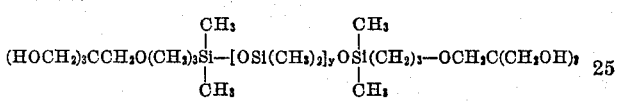

(E)

Siloxane—H(CH₃)₂Si[OSi(CH₃)₂]yOSi(CH₃)₂H
Olefin—(HOCH₂)₃CCH₂OCH₂CH=CH₂
Product—

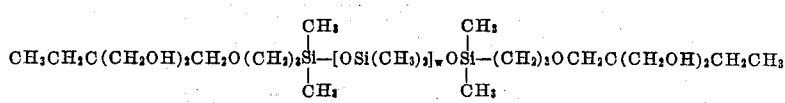

*Example 11*

The copolymers listed below containing the specified units can be prepared when the appropriate materials are employed in the process of Example 5.

(A) (CF₃CH₂CH₂)₂SiO and
 (CH₃)[CH₃CH₂C(CH₂OH)₂ CH₂O(CH₂)₃]SiO
(B) CH₃SiO₃/₂, (C₆H₅)₂SiO and
 (C₆H₅)[CH₃CH₂C(CH₂OH)₂CH₂O(CH₂)₃]SiO
(C) (CH₃)₂SiO, (C₆H₅)(CH₃)SiO, CH₃SiO₃/₂ and
 (C₆H₅)[(HOCH₂)₃CCH₂O(CH₂)₃]SiO
(D) C₆H₅SiO₃/₂, CH₃SiO₃/₂, (C₆H₅)(CH₃)SiO and
 (CH₃)[HOCH₂CH₂CH₂)₂CHCH₂O(C₂)₃
 O(CH₂)₂]SiO
(E) CH₃SiO₃/₂, (C₆H₅)(CH₃)SiO, (C₆H₅)₂SiO and
 [(HOCH₂)₂CH(CH₂)₅]₂SiO.

That which is claimed is:

1. A siloxane having the general formula

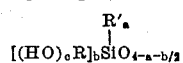

wherein each R is independently selected from the group consisting of trivalent and tetravalent hydrocarbon and hydrocarbon ether radicals and is bonded to the silicon atom through a silicon-carbon bond, R' is a monovalent hydrocarbon radical free of aliphatic unsaturation, $a$ is an integer from 0 to 3 inclusive, $b$ is an integer from 1 to 2 inclusive, $c$ is an integer from 2 to 3 inclusive and all of the hydroxyl groups are primary hydroxyl groups.

2. A siloxane as defined in claim 1 having the general formula

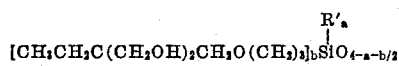

3. A siloxane as defined in claim 2 wherein $b$ is 1.

4. A siloxane as defined in claim 2 wherein $b$ is 2.

5. A siloxane as defined in claim 1 having the general formula

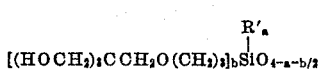

6. A siloxane as defined in claim 5 wherein $b$ is 1.
7. A siloxane as defined in claim 5 wherein $b$ is 2.
8. A copolymer consisting essentially of at least one siloxane unit having the general formula (1) 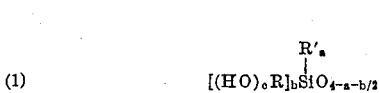

wherein each R is independently selected from the group consisting of trivalent and tetravalent hydrocarbon and hydrocarbon ether radicals and is bonded to the silicon atom through a silicon-carbon bond, R' is a monovalent hydrocarbon radical free of aliphatic unsaturation, $a$ is an integer from 0 to 3 inclusive, $b$ is an integer from 1 to 2 inclusive, $c$ is an integer from 2 to 3 inclusive and all the hydroxyl groups are primary hydroxyl groups, the remaining siloxane units having the general formula (2) $R''_n SiO_{4-n/2}$ wherein each R'' is independently selected from the group consisting of monovalent hydrocarbon and halogenated hydrocarbon radicals free of aliphatic unsaturation and $n$ is an integer from 0 to 3 inclusive.

9. A copolymer as defined by claim 8 wherein the siloxane (1) has the general formula

10. A copolymer as defined by claim 9 wherein $b$ is 1.
11. A copolymer as defined by claim 10 wherein R'' of siloxane (2) is selected from the group consisting of the methyl, phenyl and 3,3,3-trifluoropropyl radicals.
12. A copolymer as defined by claim 8 wherein the siloxane (1) has the general formula

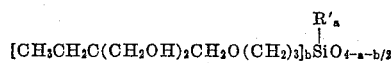

13. A copolymer as defined by claim 12 wherein $b$ is 1.
14. A copolymer as defined by claim 13 wherein R'' of siloxane (2) is selected from the group consisting of the methyl, phenyl and 3,3,3-trifluoropropyl radicals.
15. A siloxane having the formula

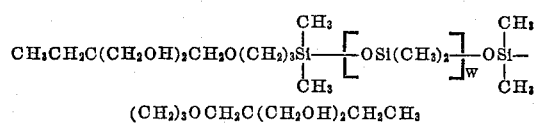

wherein $w$ is an integer.

16. A siloxane having the formula

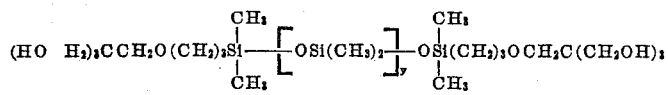

wherein $y$ is an integer.

17. A siloxane having the formula

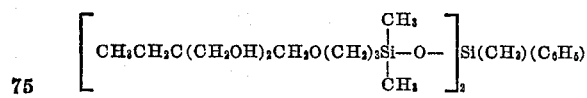

18. A siloxane having the formula

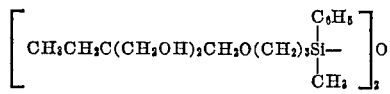

19. A copolymer consisting of the siloxane units $(C_6H_5)(CH_3)SiO$ and $(C_6H_5)[CH_3CH_2C(CH_2OH)_2CH_2O(CH_2)_3]SiO$ 20. A copolymer consisting of the siloxane units $(C_6H_5)(CH_3)SiO$ and $(CH_3)[CH_3CH_2C(CH_2OH)_2CH_2O(CH_2)_3]SiO$ 21. A copolymer consisting of the siloxane units $(C_6H_5)_2SiO$, $(CH_3)_2SiO$ and $(CH_3)[CH_3CH_2C(CH_2OH)_2CH_2O(CH_2)_3]SiO$

References Cited by the Examiner

UNITED STATES PATENTS

| | | | |
|---|---|---|---|
| Re. 25,727 | 2/1965 | Haluska | 260—46.5 |
| 2,545,689 | 3/1951 | Dannenberg et al. | 260—91.1 |
| 2,678,938 | 5/1954 | Frisch et al. | 260—448.2 |
| 2,721,873 | 11/1955 | MacKenzie et al. | 260—448.2 |
| 2,823,218 | 2/1958 | Speier et al. | 260—448.2 |
| 2,902,468 | 9/1959 | Fianu | 260—46.5 |
| 2,996,479 | 8/1961 | Sterman | 260—46.5 |
| 3,172,899 | 3/1965 | Bailey | 260—448.8 |

FOREIGN PATENTS 604,720  9/1960  Canada.

DONALD E. CZAJA, *Primary Examiner.*

LEON J. BERCOVITZ, WILLIAM H. SHORT, M. I. MARQUIS, *Assistant Examiners.*